Patented Aug. 14, 1923.

1,464,949

UNITED STATES PATENT OFFICE.

RAIMUND J. LÖFFLER, OF DRESDEN, GERMANY, ASSIGNOR TO WILLIAM L. VOIGT, OF NEW YORK, N. Y.

COMPOSITION FOR USE IN MANUFACTURING ARTIFICIAL FIBERS, FILMS, LEATHER, AND THE LIKE AND PROCESS OF MAKING THE SAME.

No Drawing.     Application filed March 31, 1921. Serial No. 457,535.

*To all whom it may concern:*

Be it known that I, RAIMUND J. LÖFFLER, a citizen of Germany, residing at Dresden, A., Germany, have invented a new and useful Composition for Use in Manufacturing Artificial Fibers, Films, Leather, and the like and Processes of Making the Same, of which the following is a specification.

This invention relates to the production and use of a composition which is particularly useful in the manufacture of artificial silk, fibers, hairs and films, as a plastic mass or hardened to make a substitute for horns, and in the manufacture of glazed leather and the like. I have found that when the lignosulfoacids of sulfite cellulose liquors come in contact with solutions of glue, gelatin, albumin or other proteins, and particularly (because of its low cost) glue, the precipitated mass is particularly suitable for the purposes indicated. For convenience, I refer to the precipitated substances collectively as lignoprotein.

By mixing lignoprotein and viscose or copper oxid ammonia cellulose, artificial silk, fibers, hairs and films can be made which possess new and valuable properties not found in the artificial products heretofore known, as, for instance, a much higher affinity for many dyestuffs, a curling and felting property and a higher tensile strength.

The lignoproteins differ in chemical properties from other products precipitated by acid alone from the sulfite cellulose liquors in that they contain nitrogen. Furthermore they are insoluble in water, so that they can be quantitatively precipitated even in very dilute solutions, whereas precipitation with acids necessitates more concentrated sulfite liquors and the precipitations are not suitable for spinning by reason of redissolution when it is attempted to put them into a solution suitable for the manufacture of artificial silk. The physical properties of the lignoproteins are also different from those of products obtained from sulfite cellulose liquor by precipitation with acids. Lignoproteins have, after evaporation and drying, horn-like characteristics and they have a high adhesive strength in alkaline as well as acid solutions, whereas precipitation with acids has a more dextrine-like character and, after drying, is brittle and easily crushable, so that it cannot be used for spinning.

Example 1: Artificial silk or the like embodying the invention may be made as follows: A lignoprotein, preferably lignoglutin, made by mixing protein, preferably glue, with free lignosulfites, preferably in sulfite cellulose liquor, is dissolved in as small a quantity as necessary of caustic soda lye and the cold solution mixed with a viscose solution ready for spinning. The proportion of lignoprotein to cellulose can be changed within wide limits. The viscosity of the spinning solution can be regulated by the addition of water. The spinning solution is spun like ordinary viscose solution and fixed like it, but can finally be hardened by formaldehyde or solution of metals salts.

One can also proceed by adding a neutral or slightly alkaline mixture of sulfite cellulose liquor and glue to the viscose. In this case, the lignoglutin develops at the same time with the regenerated cellulose in the precipitating bath. In mixing the copper oxid ammonia cellulose, one proceeds in the same manner—only in that case the lignoglutin is dissolved in ammonia. Lignoglutin can also be used with acetylcellulose, but then the solution must take place in the presence of suitable organic acids.

Example 2: In the manufacture of silk and the like, one can also proceed by adding one of the components of the lignoprotein bodies to the viscose spinning solution and the other to the precipitating bath, in which case the lignoglutin body separates at the same time with the cellulose.

Example 3: Both components in practically neutral or slightly alkaline solution of suitable consistency are added to the viscose solution, then spun and hardened as usual. Here the lignoprotein will separate with the cellulose in the acid or hardening bath.

Example 4: Lime-free neutral sulfite liquor is mixed with a solution of castor oil or oleic soap, to which is added a glue solution, and precipitation is effected with acids. The separated plastic mass is freed from superfluous water by decanting or kneading. Instead of adding a soap solution before precipitation, one can use mineral oils, vegetable or animal oils and fats, also hygroscopic substances, such as glycerine, chloride of magnesia, and incorporate any of them with the precipitated lignoprotein by kneading. When kneading, other fillers, such as sawdust, oxid of zinc, kaolin, etc., can be added to the mass.

Example 5: To produce a substitute for horns, which in cold water can be carved, turned, polished, etc., and is pliable in heat, so that it can be molded, shaped or put in any desired form, the lignoproteins are treated with alum earths or chrome salts, such as alum salts of alluminia, bichromate of soda or hardened with formaldehyde in solution or vapor form.

Example 6: To produce a finish for glazed leather, blood is mixed with sulfite liquor and the lignoalbumin precipitated or separated by acid, then washed several times with water and then dissolved with the addition of ammonia. To the solution may be added dyestuffs such as water soluble nigrosin. This solution is applied to the leather and dried. The leather is then treated as usual with glass rolls to produce the glaze.

I claim:—

1. A composition for use as an ingredient in manufacturing artificial fibers, films, leather and the like, comprising the combination of a lignosulfoacid with a protein substance.

2. A composition for use in manufacturing artificial fibers, films, leather and the like, comprising the combination of a lignosulfoacid with glue and viscose.

3. A composition for use in manufacturing artificial fibers, films, leather and the like, comprising viscose and a lignoprotein precipitated from a sulfite cellulose liquor.

4. A composition for use in manufacturing artificial fibers, films, leather and the like, comprising viscose and the substance precipitated when the lignosulfoacids of sulfite cellulose liquors are brought in contact with a protein.

5. The process of making a composition for use in manufacturing artificial fibers, films, leather or the like which comprises adding a protein to the lignosulfoacids of sulfite cellulose liquors.

6. The process of making a composition for use in the manufacture of artificial fibers, films, leather and the like which comprises precipitating lignoprotein from sulfite cellulose liquors.

7. The process of making a composition for use in the manufacture of artificial fibers, films, leather and the like which comprises precipitating lignosulfoacids from sulfite cellulose liquors by means of a protein.

RAIMUND J. LÖFFLER.

Witnesses:
CARL LOUIS VOIGT,
FRITZ LEUFFLEBLE.